US012166288B2

(12) United States Patent
Wang et al.

(10) Patent No.: US 12,166,288 B2
(45) Date of Patent: Dec. 10, 2024

(54) ANTENNA STRUCTURE, ARRAY ANTENNA AND ELECTRONIC DEVICE

(71) Applicants: Beijing BOE Sensor Technology Co., Ltd., Beijing (CN); BOE TECHNOLOGY GROUP CO., LTD., Beijing (CN)

(72) Inventors: Yiming Wang, Beijing (CN); Xiaoqiang Yang, Beijing (CN); Cuiwei Tang, Beijing (CN); Wei Zhao, Beijing (CN); Lu Chen, Beijing (CN); Zixiang Lin, Beijing (CN); Chuncheng Che, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/015,748

(22) PCT Filed: Feb. 25, 2022

(86) PCT No.: PCT/CN2022/077924

§ 371 (c)(1),
(2) Date: Jan. 12, 2023

(87) PCT Pub. No.: WO2023/159471

PCT Pub. Date: Aug. 31, 2023

(65) Prior Publication Data

US 2024/0250423 A1 Jul. 25, 2024

(51) Int. Cl.
*H01Q 3/36* (2006.01)
*H01Q 3/44* (2006.01)

(52) U.S. Cl.
CPC ................. *H01Q 3/36* (2013.01); *H01Q 3/44* (2013.01)

(58) Field of Classification Search
CPC .................................. H01Q 3/36; H01Q 3/44
See application file for complete search history.

(56) References Cited

U.S. PATENT DOCUMENTS

2018/0076521 A1* 3/2018 Mehdipour ............ H01Q 5/335
2021/0080765 A1 3/2021 Hu et al.
2021/0408681 A1 12/2021 Suzuk et al.

FOREIGN PATENT DOCUMENTS

CN 102017306 A 4/2011
CN 102956965 A 3/2013
(Continued)

*Primary Examiner* — Daniel Munoz
(74) *Attorney, Agent, or Firm* — HOUTTEMAN LAW LLC

(57) ABSTRACT

Provided are an antenna structure, an array antenna and an electronic device. The antenna structure includes a first substrate, a second substrate and a dielectric layer with an adjustable dielectric constant. The first substrate includes a first base and a first and a second radiation phase shift unit. The second substrate includes a second base and a third and a fourth radiation phase shift unit. Orthographic projections of the first and third radiation phase shift units on the first base at least partially overlap. Orthographic projections of the second and fourth radiation phase shift units on the first base at least partially overlap. A first included angle is formed between extending directions of radiation areas of the first and second radiation phase shift units; a second included angle is formed between extending directions of radiation areas of the third and fourth radiation phase shift units.

20 Claims, 7 Drawing Sheets

(56) References Cited

FOREIGN PATENT DOCUMENTS

| | | | | |
|---|---|---|---|---|
| CN | 110350310 | A | | 10/2019 |
| CN | 111682317 | A | | 9/2020 |
| CN | 111987469 | A | | 11/2020 |
| CN | 112886251 | A | | 6/2021 |
| CN | 113839189 | A | | 12/2021 |
| CN | 113871820 | A | * | 12/2021 |
| EP | 3823088 | A1 | | 5/2021 |

* cited by examiner

ANTENNA STRUCTURE, ARRAY ANTENNA AND ELECTRONIC DEVICE

TECHNICAL FIELD

The present disclosure relates to the field of communication technology, and particularly relates to an antenna structure, an array antenna and an electronic device.

BACKGROUND

A reconfigurable antenna can realize independent adjustability of radiation characteristics without changing a physical structure and an aperture of the antenna, and due to such functional diversity, the reconfigurable antenna can meet requirements of a current wireless communication system on channels and rates, can reduce the number and cost of antennas to a great extent, and has very important value in practical applications.

SUMMARY

The present disclosure is directed to solve at least one technical problem in the related art, and provides an antenna structure, an array antenna, and an electronic device, which are capable of realizing a reconfiguration of multiple polarization modes, and have simple structures and are easy to be manufactured.

In a first aspect, the present disclosure provides an antenna structure including: a first substrate and a second substrate opposite to each other, and a dielectric layer, with an adjustable dielectric constant, arranged between the first substrate and the second substrate; the first substrate includes a first base, a first radiation phase shift unit and a second radiation phase shift unit, the first radiation phase shift unit and the second radiation phase shift unit are arranged on a side, close to the dielectric layer, of the first base and are insulated from each other; the second substrate includes a second base, a third radiation phase shift unit and a fourth radiation phase shift unit, the third radiation phase shift unit and the fourth radiation phase shift unit are arranged on a side, close to the dielectric layer, of the second base and are insulated from each other; orthographic projections of the first radiation phase shift unit and the third radiation phase shift unit on the first base at least partially overlap with each other; orthographic projections of the second radiation phase shift unit and the fourth radiation phase shift unit on the first base at least partially overlap with each other; a first included angle is formed between an extending direction in which a radiation area of the first radiation phase shift unit extends and an extending direction in which a radiation area of the second radiation phase shift unit extends; a second included angle is formed between an extending direction in which a radiation area of the third radiation phase shift unit extends and an extending direction in which a radiation area of the fourth radiation phase shift unit extends, and the first included angle is equal to the second included angle.

In some examples, each of the first radiation phase shift unit, the second radiation phase shift unit, the third radiation phase shift unit and the fourth radiation phase shift unit includes a radiation portion and a reflective phase shift portion connected to the radiation portion, an orthographic projection of the reflective phase shift portion of the first radiation phase shift unit on the first base and an orthographic projection of the reflective phase shift portion of the third radiation phase shift unit on the first base at least partially overlap with each other, and an orthographic projection of the radiation portion of the first radiation phase shift unit on the first base and an orthographic projection of the radiation portion of the third radiation phase shift unit on the first base at least partially overlaps with each other; an orthographic projection of the reflective phase shift portion of the second radiation phase shift unit on the first base and an orthographic projection of the reflective phase shift portion of the fourth radiation phase shift unit on the first base at least partially overlaps with each other, and an orthographic projection of the radiation portion of the second radiation phase shift unit on the first base and an orthographic projection of the radiation portion of the fourth radiation phase shift unit on the first base at least partially overlaps with each other.

In some examples, the radiation portion of the first radiation phase shift unit and the radiation portion of the second radiation phase shift unit are patch structures; the radiation portion of the third radiation phase shift unit and the radiation portion of the fourth radiation phase shift unit are patch structures; the patch structure of the first radiation phase shift unit includes a first radiation area, and an orthogonal projection of the first radiation area on the first base is located in an orthogonal projection of the patch structure of the third radiation phase shift unit on the first base; the patch structure of the second radiation phase shift unit includes a second radiation area, and an orthographic projection of the second radiation area on the second base is located in an orthographic projection of the patch structure of the fourth radiation phase shift unit on the second base.

In some examples, the radiation portion of each of the first radiation phase shift unit, the second radiation phase shift unit, the third radiation phase shift unit and the fourth radiation phase shift unit is a dipole structure.

In some examples, the radiation portion of each of the first radiation phase shift unit, the second radiation phase shift unit, the third radiation phase shift unit and the fourth radiation phase shift unit includes one first radiation sub-portion and one second radiation sub-portion, the first radiation sub-portion and the second radiation sub-portion form the dipole structure; a spacing is formed between the first radiation sub-portion and the second radiation sub-portion, an extending direction in which the first radiation sub-portion extends is the same as an extending direction in which the second radiation sub-portion extends, and the first radiation sub-portion and the second radiation sub-portion are both connected with an end of the reflective phase shift portion of the radiation phase shift unit to which the first radiation sub-portion and the second radiation sub-portion belong.

In some examples, the radiation portion and the reflective phase shiftion portion of each of the first radiation phase shift unit, the second radiation phase shift unit, the third radiation phase shift unit and the fourth radiation phase shift unit are coupled to each other, and are located in different layers; the radiation portion is provided with a slit, and an area where the slit is located defines the radiation area; an orthographic projection of the slit of the radiation portion on the first base is partially overlapped with the orthographic projection of the reflective phase shift portion of the radiation phase shift unit, to which the radiation portion belongs, on the first base.

In some examples, for any one of the first radiation phase shift unit, the second radiation phase shift unit, the third radiation phase shift unit and the fourth radiation phase shift unit, a third included angle is formed between the extending direction in which the radiation area of the radiation portion extends and the extending direction in which the reflective phase shift portion extends.

In some examples, each of the first included angle and the second included angle is equal to 90°, and/or the third included angle is equal to 90°.

In some examples, the reflective phase shift portion of each of the first radiation phase shift unit, the second radiation phase shift unit, the third radiation phase shift unit and the fourth radiation phase shift unit is connected at a midpoint of the radiation portion in an extending direction in which the radiation portion extends.

In some examples, the antenna structure further includes: a reflective layer arranged on a side of the second base away from the dielectric layer.

In a second aspect, the present disclosure provides an array antenna, including a plurality of antenna structures, each of which is the antenna structure described above.

In some examples, the antenna structures are arranged in an array; first bases of the antenna structures are formed into a single piece (of one-piece structure), and second bases of the antenna structures are formed into a single piece.

In some examples, the array antenna further includes a first control unit, a second control unit, a plurality of first signal lines, a plurality of second signal lines, a plurality of third signal lines and a plurality of fourth signal lines, a first end of each first signal line is connected with one port of the first control unit, and a second end of each first signal line is connected with one first radiation phase shift unit; a first end of each second signal line is connected with one port of the second control unit, and a second end of each second signal line is connected with one second radiation phase shift unit; a first end of each third signal line is connected with one port of the first control unit, and a second end of each third signal line is connected with one third radiation phase shift unit; a first end of each fourth signal line is connected with one port of the second control unit, and a second end of each fourth signal line is connected with one fourth radiation phase shift unit; each port of the first control unit independently provides a bias voltage, and each port of the second control unit independently provides a bias voltage.

In a third aspect, the present disclosure provides an electronic device including at least one antenna structure as described above, and/or the array antenna as described above.

In some examples, the electronic device further includes: a transceiving unit configured to transmit or receive a signal; a radio frequency transceiver connected with the transceiving unit and configured to modulate the signal transmitted by the transceiving unit or demodulate a signal received by the antenna structure and then transmit the signal to the transceiving unit; a signal amplifier connected with the radio frequency transceiver and configured to raise a signal-to-noise ratio of a signal output by the radio frequency transceiver or the signal received by the antenna structure; a power amplifier connected with the radio frequency transceiver and configured to amplify power of the signal output by the radio frequency transceiver or the signal received by the antenna structure; and a filtering unit connected with the signal amplifier and the power amplifier, connected with the antenna structure and configured to filter a received signal and then send a filtered signal to the antenna structure or filter the signal received by the antenna structure.

In the antenna structure, the array antenna and the electronic device provided in the present disclosure, the first included angle is formed between the extending direction in which the radiation area of the first radiation phase shift unit extends and the extending direction in which the radiation area of the second radiation phase shift unit extends, the second included angle is formed between the extending direction in which the radiation area of the third radiation phase shift unit extends and the extending direction in which the radiation area of the fourth radiation phase shift unit extends, and the first included angle is equal to the second included angle, therefore, the first radiation phase shift unit and the third radiation phase shift unit are correspondingly responsible for coupling, phase shift and radiation of a radiation signal in a polarization direction, the second radiation phase shift unit and the fourth radiation phase shift unit are correspondingly responsible for coupling, phase shift and radiation of a radiation signal in another polarization direction, furthermore, the first radiation phase shift unit and the second radiation phase shift unit are arranged on a side of the dielectric layer, the third radiation phase shift unit and the fourth radiation phase shift unit are arranged on the other side of the dielectric layer, therefore, in a case where bias voltages are applied to such four radiation phase shift units respectively, the dielectric constant of the dielectric layer can be controlled, and thus an effect of phase shift ranging from 0° to 360° is applied on radiation signals in two polarization directions, and then the radiation signals in the two polarization directions are superposed to generate radiation signals in multiple polarization modes, that is, the reconfiguration of the multiple polarization modes is realized.

DETAIL DESCRIPTION OF EMBODIMENTS

Figure 1:
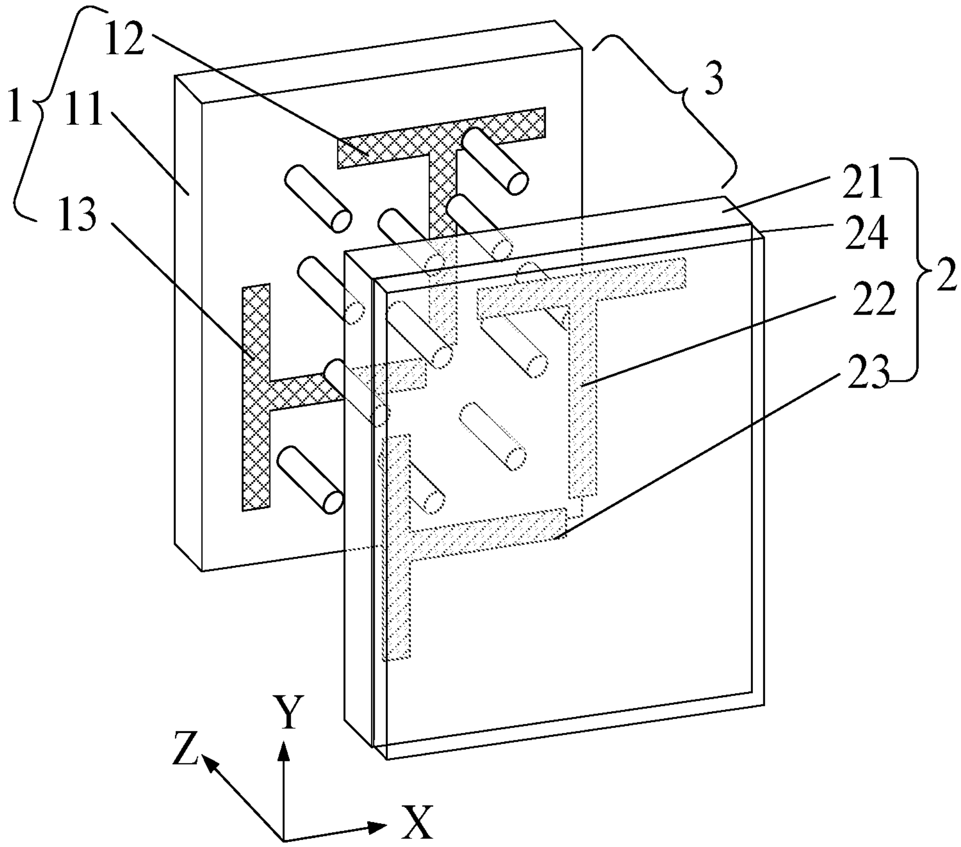
FIG. 1 is an exemplary structural diagram of an antenna structure provided in the present disclosure.

In order that those skilled in the art will better understand technical solutions of the present disclosure, the following detailed description is given with reference to the accompanying drawings and implementations.

Unless defined otherwise, technical or scientific terms used herein shall have the ordinary meaning as understood by one of ordinary skill in the art to which the present disclosure belongs. The terms “first,” “second,” and the like, as used in the description, do not denote any order, quantity, or importance, but rather are used to distinguish one element from another. Also, the use of the terms "a," "an,", "the" or the like does not denote a limitation of quantity, but rather denotes the presence of at least one. The word "comprising/including" or "comprises/includes", and the like, means that the element or item preceding the word includes the element or item listed after the word and its equivalent, but does not exclude other elements or items. The terms "connecting" or "coupling" and the like are not restricted to physical or mechanical connections, but may include electrical connections, whether direct or indirect. The words "upper/on", "lower/below", "left", "right", and the like are used only to indicate relative positional relationships, and when an absolute position of the object being described is changed, the relative positional relationships may be changed accordingly.

It should be noted that, in the present disclosure, two structures "arranged in a same layer" means that they are formed of a same material layer, and thus they are in the same layer in a stacking relationship, but it is not represented that they are equidistant from a substrate, nor that other layer structures between them and the substrate are completely the same.

The present disclosure will be described in more detail below with reference to the accompanying drawings. Like elements are denoted by like reference numerals throughout the drawings. For purposes of clarity, various features in the drawings are not drawn to scale. Moreover, certain well-known elements may not be shown in the drawings.

It should be noted that, in the present disclosure, a first direction X, a second direction Y, and a third direction Z intersect with each other, and in the present disclosure, a case where the first direction X and the second direction Y form a plane and are perpendicular to each other in the formed plane, and the third direction Z is perpendicular to the plane formed by the first direction X and the second direction Y is taken as an example for description.

In a first aspect, the present disclosure provides an antenna structure, which includes a first substrate and a second substrate that are arranged opposite to each other, and a dielectric layer, with an adjustable dielectric constant, arranged between the first substrate and the second substrate.

Specifically, the first substrate includes a first base, and a first radiation phase shift unit and a second radiation phase shift unit which are arranged on a side, close to the dielectric layer, of the first base, and the first radiation phase shift unit and the second radiation phase shift unit are insulated from each other. The second substrate includes a second base, and a third radiation phase shift unit and a fourth radiation phase shift unit which are arranged on a side, close to the dielectric layer, of the second base, and the third radiation phase shift unit and the fourth radiation phase shift unit are insulated from each other.

Orthographic projections of the first radiation phase shift unit and the third radiation phase shift unit on the first base at least partially overlap with each other, in a case where bias voltages are respectively applied to the first radiation phase shift unit and the third radiation phase shift unit, the dielectric constant of a part of the dielectric layer between the first radiation phase shift unit and the third radiation phase shift unit can be independently controlled, and if a radiation signal propagates in the part of the dielectric layer between the first radiation phase shift unit and the third radiation phase shift unit, a phase of the radiation signal can be shifted. Orthographic projections of the second radiation phase shift unit and the fourth radiation phase shift unit on the first base at least partially overlap with each other, and in a case where bias voltages are respectively applied to the second radiation phase shift unit and the fourth radiation phase shift unit, the dielectric constant of a part of the dielectric layer between the second radiation phase shift unit and the fourth radiation phase shift unit can be independently controlled, and if a radiation signal propagates in the part of the dielectric layer between the second radiation phase shift unit and the fourth radiation phase shift unit, a phase of the radiation signal can be shifted.

A first included angle is formed between an extending direction in whch a radiation area of the first radiation phase shift unit extends and an extending direction in which a radiation area of the second radiation phase shift unit extends, a second included angle is formed between an extending direction in which a radiation area of the third radiation phase shift unit and an extending direction in which a radiation area of the fourth radiation phase shift unit extends, the first included angle is equal to the second included angle, and therefore the first radiation phase shift unit and the third radiation phase shift unit are correspondingly responsible for coupling, phase shift and radiation of a radiation signal in a polarization direction, and the second radiation phase shift unit and the fourth radiation phase shift unit are correspondingly responsible for coupling, phase shift and radiation of a radiation signal in another polarization direction.

It should be noted that the dielectric layer may be filled with any substance, such as liquid crystal molecules and ferroelectrics, with a dielectric constant that is adjustable under driving of an electric field, for convenience of explanation, the following description will be given by taking a case where the dielectric layer is formed by filling the liquid crystal molecules thereinto as an example, that is, the dielectric layer is a liquid crystal layer, but the present disclosure is not limited thereto.

In the antenna structure provided in the present disclosure, since the first included angle is formed between the extending direction in which the radiation area of the first radiation phase shift unit extends and the extending direction in which the radiation area of the second radiation phase shift unit extends, the second included angle is formed between the extending direction in which the radiation area of the third radiation phase shift unit extends and the extending direction in which the radiation area of the fourth radiation phase shift unit extends, and the first included angle is equal to the second included angle, therefore the first radiation phase shift unit and the third radiation phase shift unit are correspondingly responsible for coupling, phase shift and radiation of the radiation signal in a polarization direction, the second radiation phase shift unit and the fourth radiation phase shift unit are correspondingly responsible for coupling, phase shift and radiation of the radiation signal in another polarization direction, and since the first radiation phase shift unit and the second radiation phase shift unit are arranged on a side of the dielectric layer, the third radiation phase shift unit and the fourth radiation phase shift unit are arranged on another side of the dielectric layer, in a case where bias voltages are respectively applied to the first radiation phase shift unit, the second radiation phase shift unit, the third radiation phase shift unit and the fourth radiation phase shift unit, the dielectric constant of the dielectric layer can be controlled, so that an effect of phase shift ranging from 0° to 360° may be applied to radiation signals in two polarization directions by controlling magnitudes of the bias voltages, and then the radiation signals in the two polarization directions are superposed to generate radiation signals in multiple polarization modes, that is, a reconfiguration of multiple polarization modes is realized.

It should be noted that the multiple polarization modes of the above radiation signals include, but not limited to, a linear polarization, an acircular polarization, and an elliptical polarization, the linear polarization includes a horizontal polarization and a vertical polarization, and the circular polarization includes a left-hand circular polarization and a right-hand circular polarization. The polarization characteristic of the antenna structure is defined by a spatial orientation of an electric field intensity vector of the radiation signal received or transmitted by the radiation area in a maximum radiation direction, and different polarization modes are distinguished according to a motion track of an endpoint of the electric field intensity vector. In a case where an included angle between a polarization plane of the radiation signal and a normal plane of the Earth changes periodically from 0° to 360°, that is, a magnitude of the electric field does not change, a direction of the electric field changes with time, a projection of the track of the endpoint of the electric field intensity vector on a plane perpendicular to a propagation direction of the radiation signal being a circle is called as the circular polarization. The circular polarization can be obtained if horizontal and vertical components of the electric field have the same amplitude and a phase difference of 90° or 270° exists between the horizontal and vertical components of the electric field. For the circular polarization, if the polarization plane rotates with time and a right-hand spiral relationship is formed between the polarization plane and the propagation direction of an electromagnetic wave, it is called the right-hand circular polarization; conversely, if the polarization plane rotates with time and a left-hand spiral relationship is formed between the polarization plane and the propagation direction of the electromagnetic wave, it is called the left-hand circular polarization.

The antenna structure provided by the present disclosure is described in detail below with reference to the accompanying drawings.

Figure 2:
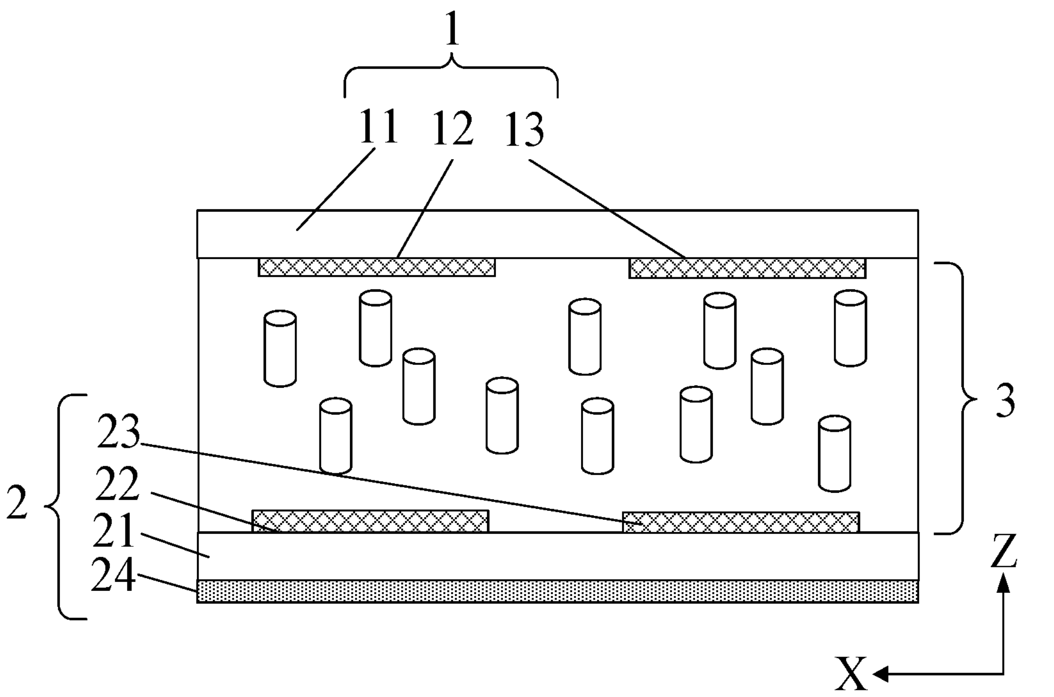
FIG. 2 is an exemplary cross-sectional view (in a Z-direction) of an antenna structure provided in the present disclosure.
Figure 3:
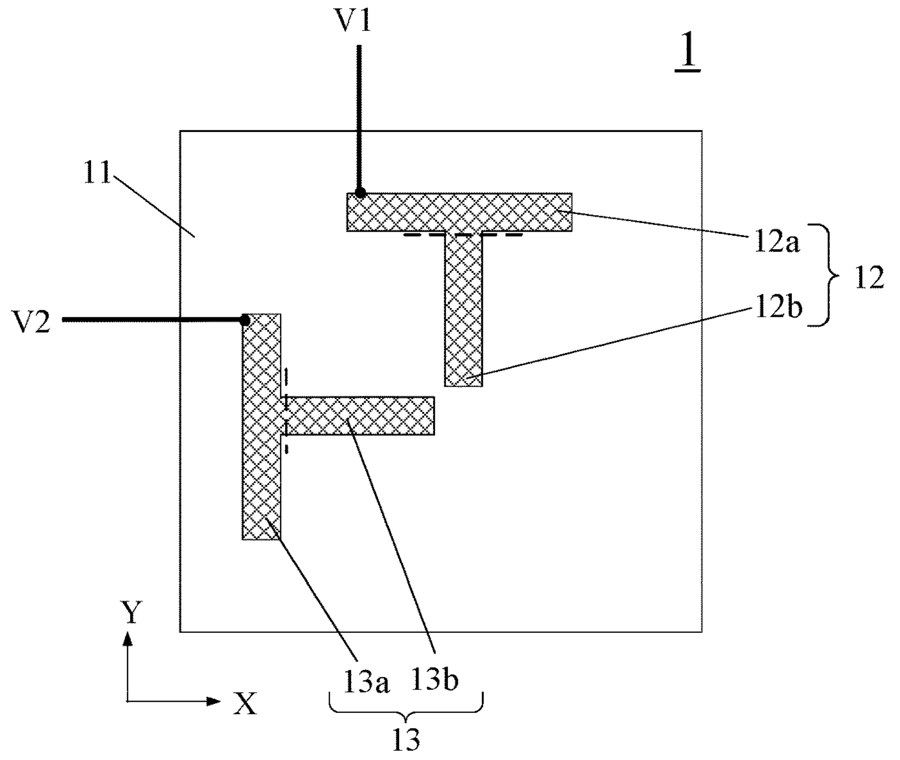
FIG. 3 is an exemplary planar diagram of a structure of an antenna structure viewed from a side of a first substrate in the present disclosure.
Figure 4:
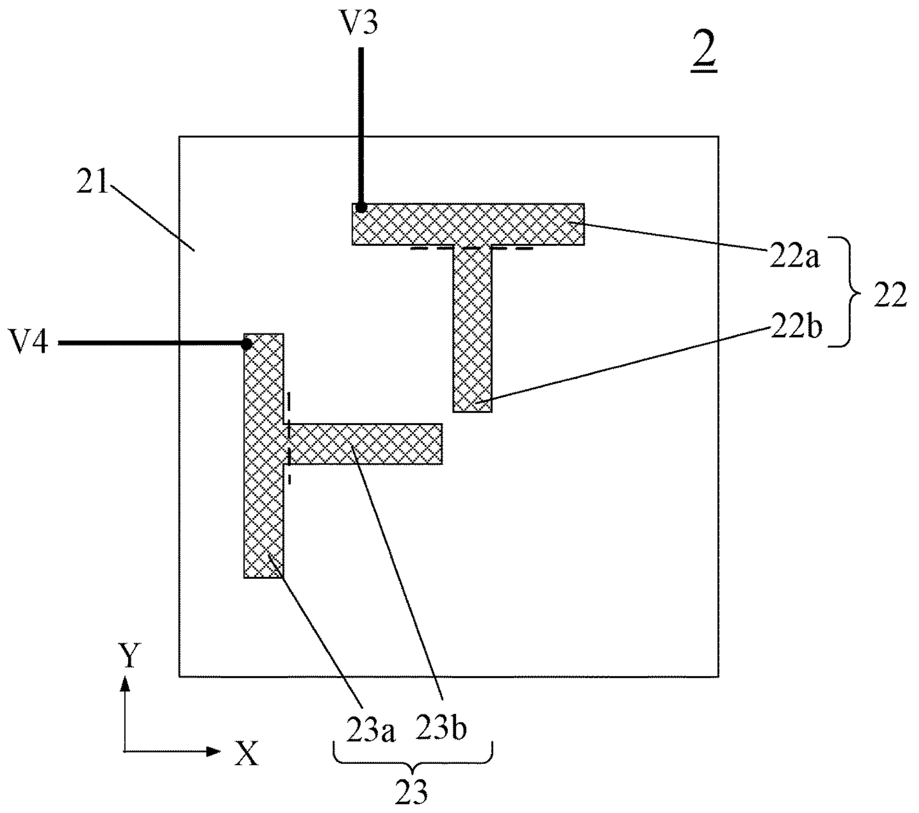
FIG. 4 is an exemplary planar diagram of a structure of an antenna structure viewed from a side of a second substrate in the present disclosure.

Referring to FIG. 1 to FIG. 4, FIG. 1 is a schematic structural diagram of an antenna structure provided in the present disclosure, FIG. 2 is a schematic cross-sectional view of an antenna structure in a vertical direction (i.e., a third direction Z) in the present disclosure, FIG. 3 is a schematic structural diagram of a first substrate of an antenna structure provided in the present disclosure, and FIG. 4 is a schematic structural diagram of a second substrate of an antenna structure provided in the present disclosure, for convenience of illustrating film structures of the antenna structure, the second base of the second substrate and a reflective layer in FIG. 1 are illustrated as translucent, but materials and light transmittances thereof are not limited. The antenna structure includes a first substrate 1 and a second substrate 2 arranged opposite to each other, and a liquid crystal layer 3 arranged between the first substrate 1 and the second substrate 2. The first substrate 1 includes a first base 11, and a first radiation phase shift unit 12 and a second radiation phase shift unit 13 arranged on a side of the first base 11 close to the liquid crystal layer 3, and the first radiation phase shift unit 12 and the second radiation phase shift unit 13 are insulated from each other. The second substrate 2 includes a second base 21 and a third radiation phase shift unit 22 and a fourth radiation phase shift unit 23 arranged on a side of the second base 21 close to the liquid crystal layer 3, and the third radiation phase shift unit 22 and the fourth radiation phase shift unit 23 are insulated from each other.

Orthographic projections of the first radiation phase shift unit 12 and the third radiation phase shift unit 22 on the first base 11 at least partially overlap with each other, and orthographic projections of the second radiation phase shift unit 13 and the fourth radiation phase shift unit 23 on the first base 11 at least partially overlap with each other. A first included angle is formed between an extending direction in which a radiation area of the first radiation phase shift unit 12 extends and an extending direction in which a radiation area of the second radiation phase shift unit 13 extends, a second included angle is formed between an extending direction in which a radiation area of the third radiation phase shift unit 22 extends and an extending direction in which a radiation area of the fourth radiation phase shift unit 23 extends, and the first included angle is equal to the second included angle.

Based on above structural characteristics, in the antenna structure, since the first included angle between the extending direction (i.e., the first direction X in FIGS. 1 to 4) in which the radiation area of the first radiation phase shift unit 12 located on an upper side of the liquid crystal layer 3 extends and the extending direction (i.e., the second direction Y in FIGS. 1 to 4) in which the radiation area of the second radiation phase shift unit 13 located on the upper side of the liquid crystal layer 3 extends is equal to the second included angle between the extending direction (i.e., the first direction X in FIGS. 1 to 4) in which the radiation area of the third radiation phase shift unit 22 located on a lower side of the liquid crystal layer 3 extends and the extending direction (i.e., the second direction Y in FIGS. 1 to 4) in which the radiation area of the fourth radiation phase shift unit 23 located on the lower side of the liquid crystal layer 3 extends, further, the first radiation phase shift unit 12 overlaps the third radiation phase shift unit 22, and the second radiation phase shift unit 13 overlaps the fourth radiation phase shift unit 23, therefore extending directions in which radiation areas of the first radiation phase shift unit 12 and the third radiation phase shift unit 22 extend are the same, the first radiation phase shift unit 12 and the third radiation phase shift unit 22 are correspondingly responsible for coupling, phase shift and radiation of a radiation signal in a first polarization direction of spatial radiation signals, extending directions in which radiation areas of the second radiation phase shift unit 13 and the fourth radiation phase shift unit 23 extend are the same, and the second radiation phase shift unit 13 and the fourth radiation phase shift unit 23 are correspondingly responsible for coupling, phase shift and radiation of a radiation signal in a second polarization direction of the spatial radiation signals. The first polarization direction and the second polarization direction are related to the first included angle and the second included angle, and for convenience of description, a case where each of the first included angle and the second included angle is equal to 90° is taken as an example for description, that is, extending directions in which radiation areas of the first radiation phase shift unit 12 and the second radiation phase shift unit 13 extend are perpendicular to each other, extending directions in which radiation areas of the third radiation phase shift unit 22 and the fourth radiation phase shift unit 23 extend are perpendicular to each other, so that a linear polarized radiation signal generated in the radiation area of the first radiation phase shifting unit 12 and the radiation area of the third radiation phase shifting unit 22 is orthogonal to a linear polarized radiation signal generated in the radiation area of the second radiation phase shift unit 13 and the radiation area of the fourth radiation phase shift unit 23.

Further, each of the first radiation phase shift unit 12, the second radiation phase shift unit 13, the third radiation phase shift unit 22 and the fourth radiation phase shift unit 23 includes a radiation portion and a reflective phase shift portion connected to the radiation portion, and the radiation portion is connected to an end of the reflective phase shift portion, and specifically, referring to FIG. 3, the first radiation phase shift unit 12 includes a radiation portion 12*a* and a reflective phase shift portion 12*b* connected to the radiation portion 12*a*; the second radiation phase shift unit 13 includes a radiation portion 13*a* and a reflective phase shift portion 13*b* connected to the radiation portion 13*a*. Referring to FIG. 4, the third radiation phase shift unit 22 includes a radiation portion 22*a* and a reflective phase shift portion 22*b* connected to the radiation portion 22*a*; the fourth radiation phase shift unit 23 includes a radiation portion 23*a* and a reflective phase shift portion 23*b* connected to the radiation portion 23*a*. Orthographic projections of the reflective phase shift portion 12*b* of the first radiation phase shift unit 12 and the reflective phase shift portion 22*b* of the third radiation phase shift unit 22 on the first base 11 at least partially overlap with each other, and orthographic projections of the radiation portion 12*a* of the first radiation phase shift unit 12 and the radiation portion 22*a* of the third radiation phase shift unit 22 on the first base 11 at least partially overlap with each other; orthographic projections of the reflective phase shift portion 13*b* of the second radiation phase shift unit 13 and the reflective phase shift portion 23*b* of the fourth radiation phase shift unit 23 on the first base 11 at least partially overlap with each other, and orthographic projections of the radiation portion 13*a* of the second radiation phase shift unit 13 and the radiation portion 23*a* of the fourth radiation phase shift unit 23 on the first base 11 at least partially overlap with each other.

Based on the above structure, an operation principle of the antenna structure is described as follows. The first radiation phase shift unit 12, the third radiation phase shift unit 22 and a part of the liquid crystal layer 3 between the first radiation phase shift unit 12 and the third radiation phase shift unit 22 form a radiation phase shifter, a first bias voltage V1 is applied to the first radiation phase shift unit 12, and a third bias voltage V3 is applied to the third radiation phase shift unit 22, so that an electric field between the first radiation phase shift unit 12 and the third radiation phase shift unit 22 changes deflection angles of a part of the liquid crystal molecules in the liquid crystal layer 3 in an area where the first radiation phase shift unit 12 and the third radiation phase shift unit 22 are located, thereby changing the dielectric constant of the part of the liquid crystal layer 3 in the area, and since each radiation signal has different phase shift degrees in dielectric layers with different dielectric constants, a phase shift amount ranging from 0° to 360° may be applied to the radiation signal by controlling the first bias voltage V1 and the third bias voltage V3. After being incident to the radiation portion 12*a* of the first radiation phase shift unit 12 and the radiation portion 22*a* of the third radiation phase shift unit 22, the radiation signal, in a spatial radiation, corresponding to the first polarization direction, that is in the charge of the first radiation phase shift unit 12 and the third radiation phase shift unit 22, propagates along the extending direction (for example, the second direction Y in the figure) in which the reflective phase shift portion 12*b* of the first radiation phase shift unit 12 and the reflective phase shift portion 22*b* of the third phase shift unit 22 extend, and is reflected back to the radiation portion 12*a* in response to that the radiation signal reaches an end of the reflective phase shift portion 12*b* of the first radiation phase shift unit 12 away from the radiation portion 12*a* of the first radiation phase shift unit 12 (i.e., also an end of the reflective phase shift portion 22*b* of the third radiation phase shift unit 22 away from the radiation portion 22*a* of the third radiation phase shift unit 22), during such entire propagation process, the radiation signal in the first polarization direction propagates in the liquid crystal layer 3 in the area defined by the first radiation phase shift unit 12 and the third radiation phase shift unit 22, since the liquid crystal molecules in the liquid crystal layer 3 in this area are deflected under the electric field generated by the first bias voltage V1 and the third bias voltage V3, a corresponding effect of phase shift is applied to the radiation signal in the first polarization direction, so that a corresponding phase shift amount occurs for the radiation signal in the first polarization direction, thereby generating a first linear polarized radiation signal.

Similarly, the second radiation phase shift unit 13, the fourth radiation phase shift unit 23 and a part of the liquid crystal layer 3 located between the second radiation phase shift unit 13 and the fourth radiation phase shift unit 23 form another radiation phase shifter, a second bias voltage V2 is applied to the second radiation phase shift unit 13, and a fourth bias voltage V4 is applied to the fourth radiation phase shift unit 23, so that an electric field between the second radiation phase shift unit 13 and the fourth radiation phase shift unit 23 changes deflection angles of the liquid crystal molecules in the part of the liquid crystal layer 3 in an area where the second radiation phase shift unit 13 and the fourth radiation phase shift unit 23 are located, thereby changing the dielectric constant of the part of the liquid crystal layer 3 in the area, and since a radiation signal has different phase shift degrees in dielectric layers with different dielectric constants, a phase shift amount ranging from 0° to 360° may be applied to the radiation signal by controlling the second bias voltage V2 and the fourth bias voltage V4. After being incident to the radiation portion 13*a* of the second radiation phase shift unit 13 and the radiation portion 23*a* of the fourth radiation phase shift unit 23, the radiation signal in the spatial radiation corresponding to the second polarization direction, that is in the charge of the second radiation phase shift unit 13 and the fourth radiation phase shift unit 23, propagates along the extending direction (for example, the first direction X in the figure) in which the reflective phase shift portion 13*b* of the second radiation phase shift unit 13 and the reflective phase shift portion 23*b* of the fourth radiation phase shift unit 23 extend, and is reflected back to the radiation portion 13*a* in response to that the radiation signal reaches an end of the reflective phase shift portion 13*b* of the second radiation phase shift unit 13 away from the radiation portion 13*a* of the second radiation phase shift unit 13 (i.e., also an end of the reflective phase shift portion 23*b* of the fourth radiation phase shift unit 23 away from the radiation portion 23*a* the fourth radiation phase shift unit 23), during such entire propagation process, the radiation signal in the second polarization direction propagates in the liquid crystal layer 3 in the area defined by the second radiation phase shift unit 13 and the fourth radiation phase shift unit 23, since the liquid crystal molecules in the liquid crystal layer 3 in this area are deflected under the electric field generated by the second bias voltage V2 and the fourth bias voltage V4, a corresponding effect of phase shift is applied to the radiation signal in the second polarization direction, so that a corresponding phase shift amount occurs for the radiation signal in the second polarization direction, thereby generating a second linear polarized radiation signal.

Similarly, since each of the first included angle and the second included angle is equal to 90°, in other words, the radiation area of the first radiation phase shift unit 12 and the radiation area of the second radiation phase shift unit 13 are arranged to be perpendicular to each other, and the radiation area of the third radiation phase shift unit 22 and the radiation area of the fourth radiation phase shift unit 23 are arranged to be perpendicular to each other, the first linear polarized radiation signal and the second linear polarized radiation signal are orthogonal to each other, and the first linear polarized radiation signal and the second linear polarized radiation signal are modulated by the deflection angles of the liquid crystal molecules in the liquid crystal layer 3, so that a certain phase difference exists between the first linear polarized radiation signal and the second linear polarized radiation signal, and thus the first linear polarized radiation signal and the second linear polarized radiation signal, after being superposed, generate radiation signals of different polarization modes, for example, in a case where the phase difference between the first linear polarized radiation signal and the second linear polarized radiation signal is equal to +90°, the first linear polarized radiation signal and the second linear polarized radiation signal are superposed to generate a right-hand circular polarized radiation signal; in a case where the phase difference between the first linear polarized radiation signal and the second linear polarized radiation signal is equal to −90°, the first linear polarized radiation signal and the second linear polarized radiation signal are superposed to generate a left-hand circular polarized radiation signal; in a case where the phase difference between the first linear polarized radiation signal and the second linear polarized radiation signal is equal to 0°, the first linear polarized radiation signal and the second linear polarized radiation signal are superposed to generate a linear polarized radiation signal. It should be noted that the circular polarized radiation signal includes a perfect circular polarized radiation signal and an elliptical polarized radiation signal, and in a case where an axis ratio of the circular polarized radiation signal is 1, the circular polarized radiation signal is the perfect circular polarized radiation signal; in a case where the axis ratio of the circular polarized radiation signal is greater than 1, the circular polarized radiation signal is the elliptical polarized radiation signal. For example, in a case where the phase difference between the first linear polarized radiation signal and the second linear polarized radiation signal is not equal to +90° and is not equal to 0°, the first linear polarized radiation signal and the second linear polarized radiation signal are superposed to generate an elliptical polarized radiation signal. According to the above principle, the phase difference between the first linear polarized radiation signal and the second linear polarized radiation signal may be controlled by controlling magnitudes of the first bias voltage V1 and the fourth bias voltage V4, and then the radiation signals of multiple polarization modes can be generated, that is, the reconfiguration of the multiple polarization modes can be realized.

Figure 5:
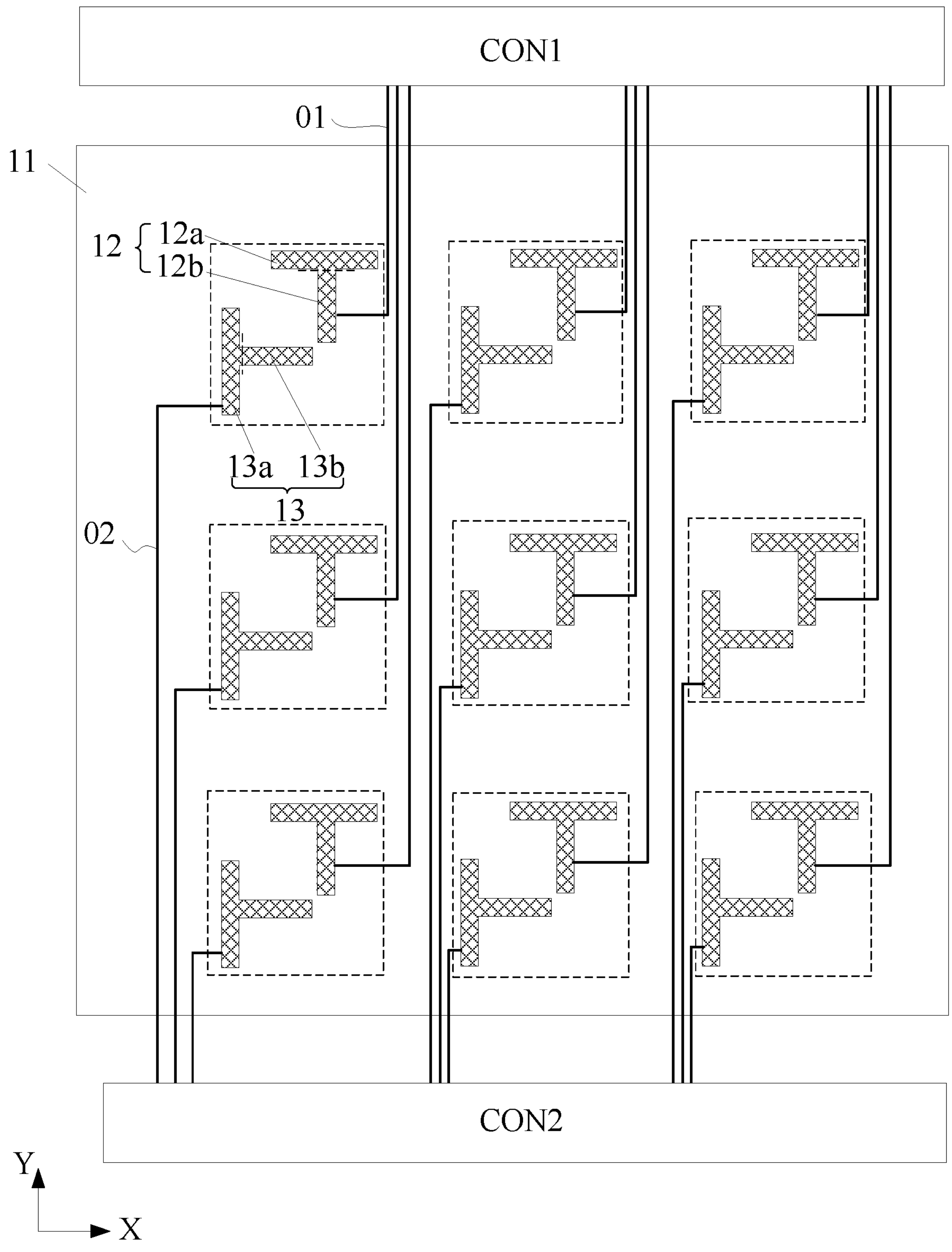
FIG. 5 is an exemplary planar structural diagram of an array antenna provided in the present disclosure.

It should be noted that, FIG. 5 is a schematic planar structural diagram of an array antenna including the antenna structure provided in the present disclosure, and referring to FIG. 5, if the antenna structure provided by the present disclosure (each dashed frame defines one antenna structure) is applied to the array antenna, by controlling the phase difference between the first linear polarized radiation signal and the second linear polarized radiation signal in each antenna structure, radiation signals in different polarization directions generated by antenna structures are superposed, so that beam scanning under a fixed polarization can be achieved, in other words, steering and deflection of a beam can be achieved, and phase modulation by using the liquid crystal layer can change the bias voltage to achieve continuous adjustment and control, so that a higher resolution can be achieved during the beam scanning.

In the antenna structure provided in the present disclosure, each of radiation portions and reflective phase shift portions of the first radiation phase shift unit to the fourth radiation phase shift unit may adopt various structures, as long as two radiation phase shift portions of radiation phase shift units, overlapped with each other, on the upper side and the lower side of the liquid crystal layer 3, and the liquid crystal layer 3 between the radiation phase shift units can be combined to form a reflection phase shifter, in other words, the reflection phase shifter can realize that, after the radiation signal is incident to the radiation area, and is transmitted from an end of the reflection phase shifter close to the radiation area (i.e., close to the radiation portion) to another end of the reflection phase shifter away from the radiation area, the radiation signal is reflected back to the radiation area and then is radiated out. The radiation portion and the reflective phase shift portion of any radiation phase shift unit (including any one of the first radiation phase shift unit, the second radiation phase shift unit, the third radiation phase shift unit and the fourth radiation phase shift unit) may be arranged in a same layer, and transmit the radiation signal in an electrical connection mode; the radiation portion and the reflective phase shift portion of any radiation phase shift unit may also be arranged in different layers, and transmit the radiation signal in a coupling mode, which will be described in detail below by way of example.

In some examples, referring to FIG. 1 to FIG. 4, the radiation portion **12*a* of the first radiation phase shift unit 12 and the radiation portion 13*a* of the second radiation phase shift unit 13 are patch structures, that is, are made of sheet metal without any slit, and in such implementation, an area defined by an orthographic projection of the patch structure (i.e., the radiation portion) of any radiation phase shift unit (i.e., any one of the first radiation phase shift unit to the fourth radiation phase shift unit) on the first base 11 is the radiation area of the radiation phase shift unit; similarly, the radiation portion 22*a* of the third radiation phase shift unit 22 and the radiation portion 23*a* of the fourth radiation phase shift unit 23 are patch structures, that is, are made of sheet metal without any slit, and in such implementation, an area defined by an orthographic projection of the patch structure (i.e., the radiation portion) of any radiation phase shift unit (i.e., any one of the first radiation phase shift unit to the fourth radiation phase shift unit) on the second base 21 is the radiation area of the radiation phase shift unit. Further, the patch structure (i.e., the radiation portion 12*a*) of the first radiation phase shift unit 12 includes a first radiation area, and an orthographic projection of the first radiation area on the first base 11 is located within an orthographic projection of the patch structure (i.e., the radiation portion 22*a*) of the third radiation phase shift unit 22 on the first base 11; the patch structure (i.e., the radiation portion 13*a*) of the second radiation phase shift unit 13 includes a second radiation area, and an orthogonal projection of the second radiation area on the second base 21 is located within an orthogonal projection of the patch structure (i.e., the radiation portion 23*a*) of the fourth radiation phase shift unit 23 on the second base 21**. In this implementation, the reflective phase shift portion and the patch structure (i.e., the radiation portion) of any radiation phase shift unit (i.e., any one of the first radiation phase shift unit to the fourth radiation phase shift unit) are arranged in a same layer and are directly and electrically connected to each other. In some examples, the reflective phase shift portion and the patch structure (i.e., the radiation portion) of each radiation phase shift unit are formed into one piece.

Figure 6:
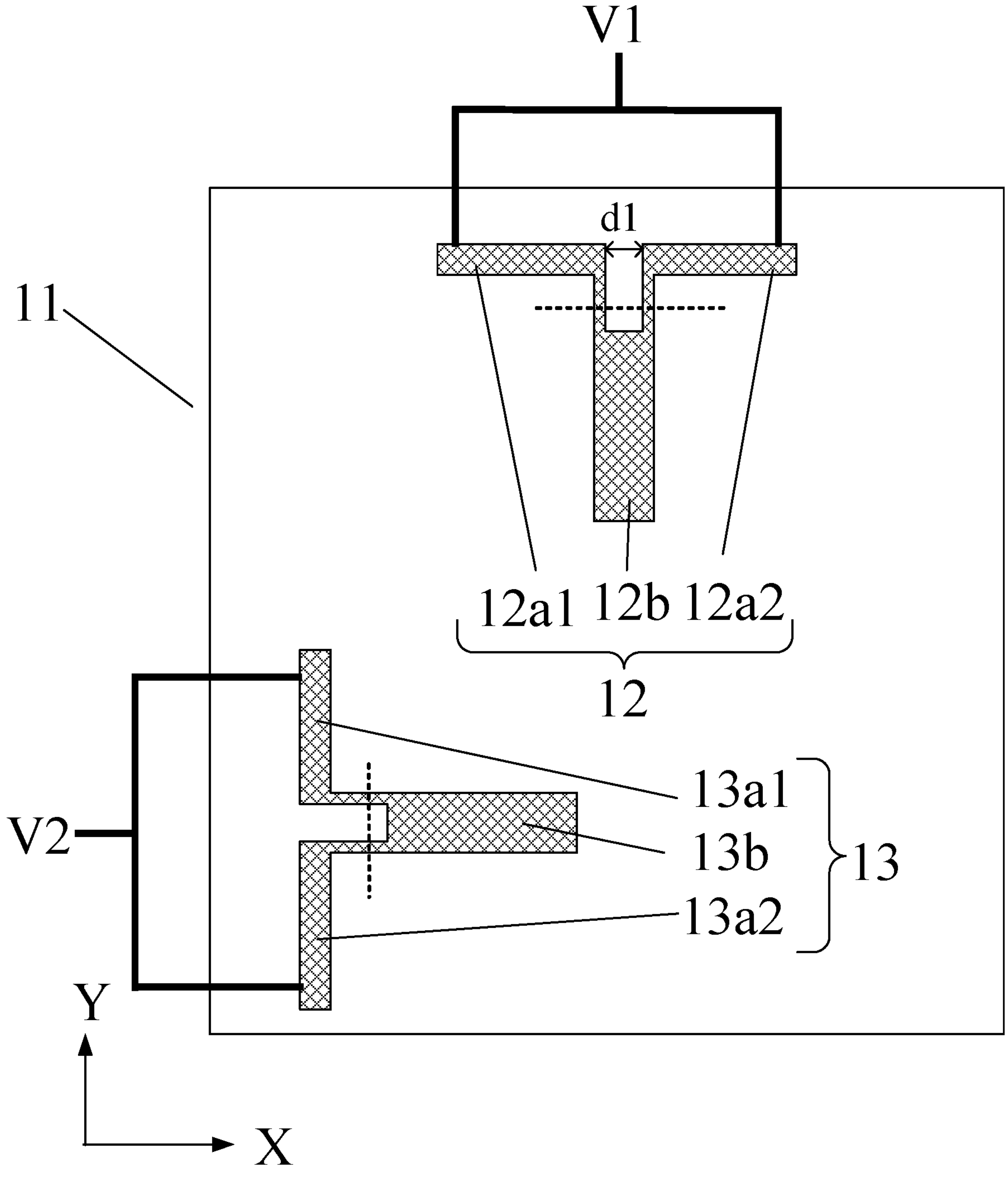
FIG. 6 is an exemplary planar diagram of a structure of an antenna structure viewed from a side of a first substrate in the present disclosure.

Further, the radiation portion of each of the first radiation phase shift unit 12, the second radiation phase shift unit 13, the third radiation phase shift unit 22, and the fourth radiation phase shift unit 23 is a dipole structure, and there are various ways to implement the dipole structure, for example, referring to FIG. 6, FIG. 6 shows a schematic planar structural diagram of the first substrate in an implementation in which the radiation portion is the dipole structure, and the third radiation phase shift unit and the fourth radiation phase shift unit on the second substrate may be arranged in a same manner, which is not described herein again. The radiation portion of each of the first radiation phase shift unit 12, the second radiation phase shift unit 13, the third radiation phase shift unit 22 and the fourth radiation phase shift unit 23 includes a first radiation sub-portion and a second radiation sub-portion, and the first radiation sub-portion and the second radiation sub-portion each are formed as a planar dipole structure. A spacing is formed between the first radiation sub-portion and the second radiation sub-portion belonging to the radiation portion of the same radiation phase shift unit, an extending direction in which the first radiation sub-portion extends is the same as an extending direction in which the second radiation sub-portion extends, and the first radiation sub-portion and the second radiation sub-portion are both connected with an end of the reflective phase shift portion of the radiation phase shift unit to which the first radiation sub-portion and the second radiation sub-portion belong. Taking an implementation shown in FIG. 6 as an example, each of the extending direction in which the first radiation sub-portion extends and the extending direction in which the second radiation sub-portion extends is the first direction X, in this implementation, the first radiation sub-portion and the second radiation sub-portion are arranged at an interval along a same horizontal line, and an area defined by orthographic projections of the first radiation sub-portion and the second sub-radiation of each radiation phase shift unit (i.e., any one of the first radiation phase shift unit to the fourth radiation phase shift unit) on the first base 11 is the radiation area of the radiation phase shift unit. For example, referring to FIG. 6, the first radiation phase shift unit 12 includes a radiation portion 12*a* and a reflective phase shift portion 12*b* connected to the radiation portion 12*a*, the radiation portion 12*a* includes a first radiation sub-portion 12*a*1 and a second radiation sub-portion 12*a*2 which are disconnected from each other, a first spacing dl is formed between the first radiation sub-portion 12*a*1 and the second radiation sub-portion 12*a*2, and each of an extending direction in which the first radiation sub-portion 12*a*1 extends and an extending direction in which the second radiation sub-portion 12*a*2 extends is the first direction X, the first radiation sub-portion 12*a*1 and the second radiation sub-portion 12*a*2 are connected to a same end of the reflective phase shift portion 12*b*. Orthographic projections of the first radiation sub-portion 12*a*1 and the second radiation sub-portion 12*a*2 on the first substrate 1 define the radiation area of the first radiation phase shift unit 12, and the first spacing dl is a spacing between an end of the first radiation portion 12*a*1 close to the second radiation sub-portion 12*a*2 and an end of the second radiation sub-portion 12*a*2 close to the first radiation portion 12*a*1 in the extending direction (for example, the first direction X in FIG. 6) in which the first radiation sub-portion 12*a*1 extends. The second radiation phase shift unit 13 includes a radiation portion 13*a* and a reflective phase shift portion 13*b* connected with the radiation portion 13*a*, the radiation portion 13*a* includes a first radiation sub-portion 13*a*1 and a second radiation sub-portion 13*a*2 which are disconnected from each other. a first spacing is formed between the first radiation sub-portion 13*a*1 and the second radiation sub-portion 13*a*2, each of an extending direction in which the first radiation sub-portion 13*a*1 extends and an extending direction in which the second radiation sub-portion 13*a*2 extends is the second direction Y. The first radiation sub-portion 13*a*1 and the second radiation sub-portion 13*a*2 are connected with a same end of the reflective phase shift portion 13*b*. Orthographic projections of the first radiation sub-portion 13*a*1 and the second radiation sub-portion 13*a*2 on the first substrate 1 define the radiation area of the second radiation phase shift unit 13. The structures of the third radiation phase shift unit 22 and the fourth radiation phase shift unit 23 may be implemented in the same manner as that of the first radiation phase shift unit 12, and are not described herein again.

Figure 7:
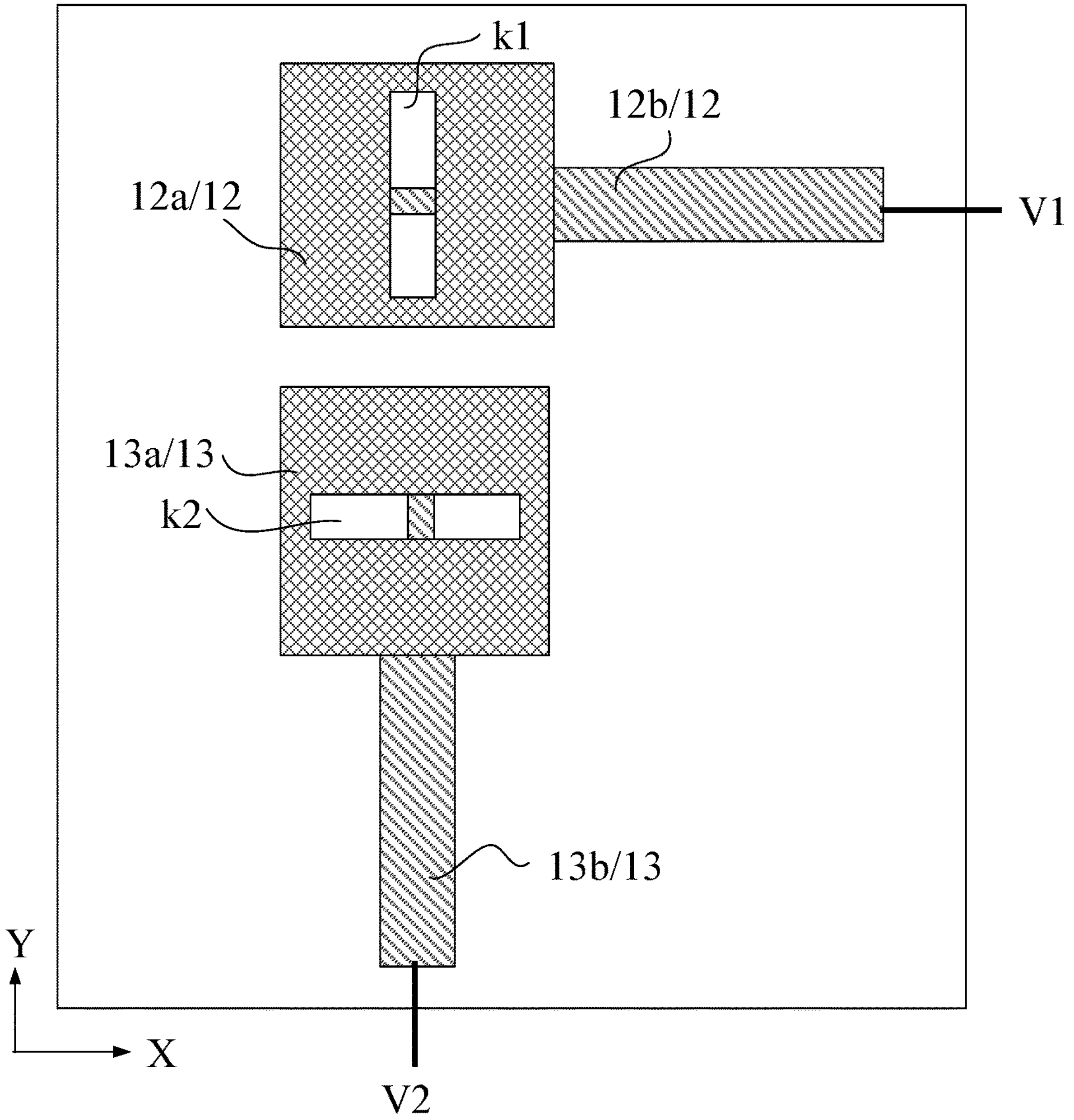
FIG. 7 is an exemplary planar diagram of a structure of an antenna structure viewed from a side of a first substrate in the present disclosure.

In some examples, the radiation portion and the reflective phase shift portion of each of the first radiation phase shift unit 12, the second radiation phase shift unit 13, the third radiation phase shift unit 22, and the fourth radiation phase shift unit 23 may also be coupled with each other, and in such implementation, the radiation portion and the reflective phase shift portion may be arranged in different layers. Referring to FIG. 7, FIG. 7 is a schematic plan view illustrating the first substrate in an implementation in which the radiation portion and the reflective phase shift portion of the radiation phase shift unit are coupled with each other, and the third radiation phase shift unit and the fourth radiation phase shift unit on the second substrate may be arranged in a same manner, which is not described herein again. The radiation portions belonging to the same radiation phase shifter each are provided with a slit therein, areas where the slits are located define radiation areas of the radiation phase shifter, specifically, an orthographic projection of the slit of each radiation portion on the first base 11 is partially overlapped with an orthographic projection of the reflective phase shift portion of the radiation phase shift unit, to which the radiation portion belongs, on the first base 11, so that the reflective phase shift portion and the radiation portion can transmit the radiation signal therebetween in a slit coupling mode. For example, referring to FIG. 7, the first radiation phase shift unit 12 includes the radiation portion 12*a* and the reflective phase shift portion 12*b* connected to the radiation portion 12*a*, the radiation portion 12*a* has a slit K1 therein, the orthogonal projection of the reflective phase shift portion 12*b* on the first base 11 at least partially overlaps an orthogonal projection of the slit K1 on the first base 11, and the orthogonal projection of the slit K1 on the first base 11 defines the radiation area of the first radiation phase shift unit 12. The second radiation phase shift unit 13 includes the radiation portion 13*a* and the reflective phase shift portion 13*b* connected to the radiation portion 13*a*, the radiation portion 13*a* has a slit K2 therein, the orthogonal projection of the reflective phase shift portion 13*b* on the first base 11 at least partially overlaps an orthogonal projection of the slit K2 on the first base 11, and the orthogonal projection of the slit K2 on the first base 11 defines the radiation area of the second radiation phase shift unit 13. The structures of the third radiation phase shift unit 22 and the fourth radiation phase shift unit 23 may be implemented in the same manner as that of the first radiation phase shift unit 12, and are not described herein again.

Certainly, the first radiation phase shift unit to the fourth radiation phase shift unit may also be implemented in other modes, for example, may be implemented into a microstrip line structure, which is not limited herein.

Figure 8:
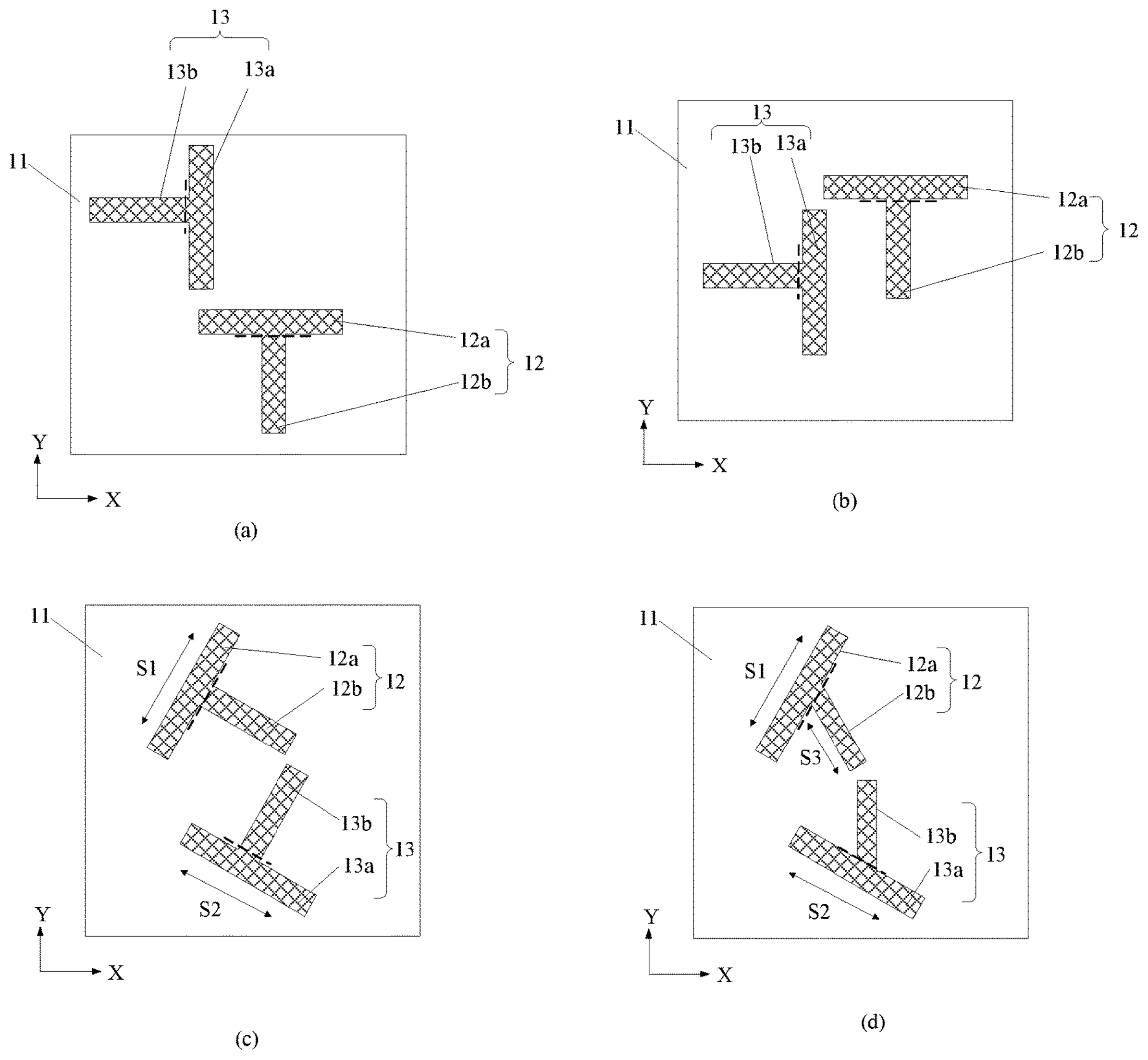
FIG. 8 is a schematic diagram illustrating arrangements of radiation phase shift units of an antenna structure provided in the present disclosure.

FIG. 8 shows a plurality of arrangement modes of the radiation phase shift units located in the same layer, and referring to FIG. 8, for each antenna structure, the first radiation phase shift unit 12 and the second radiation phase shift unit 13 located on the first base 11 may be arranged in various modes, the third radiation phase shift unit 22 and the fourth radiation phase shift unit 23 located on the second base 21 may be arranged in various modes, as long as the first included angle between the extending direction in which the radiation area of the first radiation phase shift unit 12 extends and the extending direction in which the second radiation phase shift unit 13 extends is consistent with the second included angle between the extending direction in which the radiation area of the third radiation phase shift unit 22 extends and the extending direction in which the radiation area of the fourth radiation phase shift unit 23 extends, in an implementation in which the first linear polarized radiation signal and the second linear polarized radiation signal described above are desired to be orthogonal to each other, the first included angle between the extending direction in which the radiation area of the first radiation phase shift unit 12 extends and the extending direction in which the radiation area of the second radiation phase shift unit 13 extends is desired to be equal to 90°, and the second included angle between the extending direction in which the radiation area of the third radiation phase shift unit 22 extends and the extending direction in which the radiation area of the fourth radiation phase shift unit 23 extends is desired to be equal to 90°. For example, referring to FIG. 8, in the implementations shown in (a) and (b) of FIG. 8, taking one side of the first substrate as an example, the extending direction in which the radiation area of the first radiation phase shift unit 12 extends is the first direction X, the extending direction in which the radiation area of the second radiation phase shift unit 13 extends is the second direction Y, and the first direction X and the second direction Y are perpendicular to each other. In the implementations shown in (c) and (d) of FIG. 8, taking one side of the first substrate as an example, the extending direction in which the radiation area of the first radiation phase shift unit 12 extends is a fourth direction S1, the extending direction in which the radiation area of the second radiation phase shift unit 13 extends is a fifth direction S2, and the fourth direction S1 and the fifth direction S2 are perpendicular to each other. The structures of the third radiation phase shift unit 22 and the fourth radiation phase shift unit 23 may be implemented in the same manner as that of the first radiation phase shift unit 12, and are not described herein again.

In some examples, for any one of the first radiation phase shift unit 12, the second radiation phase shift unit 13, the third radiation phase shift unit 22 and the fourth radiation phase shift unit 23, a third included angle is formed between the extending direction in which the radiation area of the radiation portion of the radiation phase shift unit extends and the extending direction in which the reflective phase shift portion of the radiation phase shift unit extends, that is, extending directions in which the reflective phase shift portion and the radiation portion of the same radiation phase shift unit extend are different, and the third included angle is in a range of (0°, 90°], for example, in the implementations shown in (a) and (b) of FIG. 8, the extending direction (e.g., the second direction Y) in which the reflective phase shift portion 12*b* of the first radiation phase shift unit 12 extends and the extending direction (e.g., the first direction X) in which the radiation portion 12*a* of the first radiation phase shift unit 12 extends are perpendicular to each other, that is, the third included angle is equal to 90°. In the implementation shown in (d) of FIG. 8, the extending direction (e.g., a sixth direction S3) of the reflective phase shift portion 12*b* of the first radiation phase shift unit 12 intersects the extending direction (e.g., the fourth direction S1) in which the radiation portion 12*a* of the first radiation phase shift unit 12 extends, and the third included angle is less than 90°. In some implementations, the reflective phase shift portion may be arranged in various modes, and may also be arranged in a multi-segment mode, a periodic or non-periodic patterns mode, and the like, so as to achieve various functions such as saving space or implementing a delay line, which is not limited herein. The structures of the second radiation phase shift unit 13, the third radiation phase shift unit 22, and the fourth radiation phase shift unit 23 may be implemented in the same manner as that of the first radiation phase shift unit 12, and are not described herein again.

In some examples, the reflective phase shift portion of each of the first radiation phase shift unit 12, the second radiation phase shift unit 13, the third radiation phase shift unit 22, and the fourth radiation phase shift units 23 may be connected at a midpoint of the radiation portion of the radiation phase shift unit in the extending direction in which the radiation portion extends.

It should be noted that, in the antenna structure provided in the present disclosure, patterns of the first radiation phase shift unit 12 and the second radiation phase shift unit 13 arranged on the first base 11 may not coincide with patterns of the third radiation phase shift unit 22 and the fourth radiation phase shift unit 23, as long as the orthographic projections of the first radiation phase shift unit 12 and the third radiation phase shift unit 22 on the first base 11 at least partially overlap with each other, and the orthographic projections of the second radiation phase shift unit 13 and the fourth radiation phase shift unit 23 on the first base 11 at least partially overlap with each other.

In some examples, referring to FIGS. 1 and 2, the antenna structure provided in the present disclosure further includes a reflective layer 24, which is arranged on a side, away from the liquid crystal layer 3, of the second base 21, an orthographic projection of the reflective layer 24 on the second base 21 covers orthographic projections of the first radiation phase shift unit, the second radiation phase shift unit, the third radiation phase shift unit and the fourth radiation phase shift unit on the second base 21, and the reflective layer 24 is configured to reflect radiation signals radiated by the first radiation phase shift unit, the second radiation phase shift unit, the third radiation phase shift unit and the fourth radiation phase shift unit toward the second base 21 to a direction away from the second base 21, so as to increase radiation efficiency of the antenna structure. The reflective layer 24 may be formed by using an entire-surface metal, or may be formed into an Electromagnetic Band Gap (EBG) structure by using periodic patterns, which is not limited herein.

In some implementations, the first base 11 and the second base 21 may be glass bases with a thickness ranging from 100 microns to 1000 microns, or may be sapphire bases, ceramic bases, etc., or may be polyethylene terephthalate bases, triallyl cyanurate bases, or polyimide transparent flexible bases with a thickness ranging from 10 microns to 500 microns. Specifically, the first base 11 and the second base 21 may be made of high-purity quartz glass with extremely low dielectric loss. Compared with common glass bases, the first base 11 and the second base 21 made of quartz glass can effectively reduce the loss of microwaves, so that the phase shifter has relatively low power consumption and high signal-to-noise ratio.

In some implementations, any one of the radiation portion and the reflective phase shift portion of each of the first radiation phase shift unit, the second radiation phase shift unit, the third radiation phase shift unit and the fourth radiation phase shift unit, and the reflective layer may be made of metal such as aluminum, silver, gold, chromium, molybdenum, nickel or iron, or may be made of an non-metal conductive material.

In some implementations, the liquid crystal molecules in the liquid crystal layer 3 are positive liquid crystal molecules or negative liquid crystal molecules, and it should be noted that, in the implementations of the present disclosure, in a case where the liquid crystal molecules are positive liquid crystal molecules, an included angle between a major axial direction of the liquid crystal molecules and a second electrode is greater than 0° and less than or equal to 45°; in a case where the liquid crystal molecules are negative liquid crystal molecules, an included angle between the major axial direction of the liquid crystal molecules and the second electrode is greater than 45° and less than 90°, so that the dielectric constant of the liquid crystal layer 3 is changed after the liquid crystal molecules are deflected, and a phase shifting purpose is achieved.

In a second aspect, the present disclosure provides an array antenna, which includes a plurality of antenna structures, each of which is the antenna structure described above.

In some examples, referring to FIG. 5, the antenna structures (each antenna structure is defined by a rectangular dashed box) are arranged in an array; first substrates 11 of the antenna structures are formed into one piece, and second substrates 21 (not shown in FIG. 5) of the antenna structures are formed into one piece, and reflective layers 24 (not shown in FIG. 5) of the antenna structures are formed into one piece.

In some examples, with continued reference to FIG. 5, the array antenna further includes a first control unit CON1, a second control unit CON2, a plurality of first signal lines 01, a plurality of second signal lines 02, a plurality of third signal lines (not shown in FIG. 5) and a plurality of fourth signal lines (not shown in FIG. 5). It should be noted that FIG. 5 illustrates structures on the side of the first substrate as an example for description, and structures on the side of the second substrate may adopt the same connection mode as that of the structures on the side of the first substrate, and will not be described repeatedly.

The first control unit CON1 and the second control unit CON2 each have a plurality of ports, and each port may independently output a bias voltage. A first end of each first signal line 01 is connected to one port of the first control unit CON1, a second end of each first signal line 01 is connected to one first radiation phase shift unit 12, and different first signal lines 01 are connected to different first radiation phase shift units 12 and different ports of the first control unit CON 1. A first end of each second signal line 02 is connected to one port of the second control unit CON2, a second end of each second signal line 02 is connected to one second radiation phase shift unit 13, and different second signal lines 02 are connected to different second radiation phase shift units 13 and different ports of the second control units CON2. A first end of each third signal line of is connected to one port of the first control unit CON1, a second end of each third signal line is connected to one third radiation phase shift unit 22, and different third signal lines are connected to different third radiation phase shift units 22 and different ports of the first control units CON1. A first end of each fourth signal line is connected to one port of the second control unit CON2, a second end of each fourth signal line is connected to one fourth radiation phase shift unit 23, and different fourth signal lines are connected to different fourth radiation phase shift units 23 and different ports of the second control unit CON2. The ports of the first control unit CON1 independently provide bias voltages, and the ports of the second control unit CON2 independently provide bias voltages, a phase difference between the radiation signals of the antenna structures can be controlled by the bias voltages (such as first to fourth bias voltages) output by the ports of the first control unit CON1 and the second control unit CON2, so as to generate radiation signals of corresponding polarization modes, so that the radiation signals with different polarization directions generated by the antenna structures are superposed, thereby realizing beam scanning under a fixed polarization, in other words, realizing steering, deflection and the like of beams, and phase modulation by using the liquid crystal layer can realize continuous modulation by changing the bias voltages, thereby resulting in a relatively high resolution during the beam scanning. In addition, the array antenna provided in the present disclosure is an air feed array antenna without any complex receiving/transmitting feed module, the arrangement of the antenna structures, the arrangement of the signal lines and the mode for driving the array antenna are flexible, resulting in a simple process for manufacturing the antenna.

In some examples, at least one of the first control unit CON1 and the second control unit CON2 of the array antenna provided in the present disclosure may employ a field programmable gate array (FPGA) circuit board.

In a third aspect, the present disclosure provides an electronic device including at least one antenna structure described above, and/or the array antenna described above.

Figure 9:
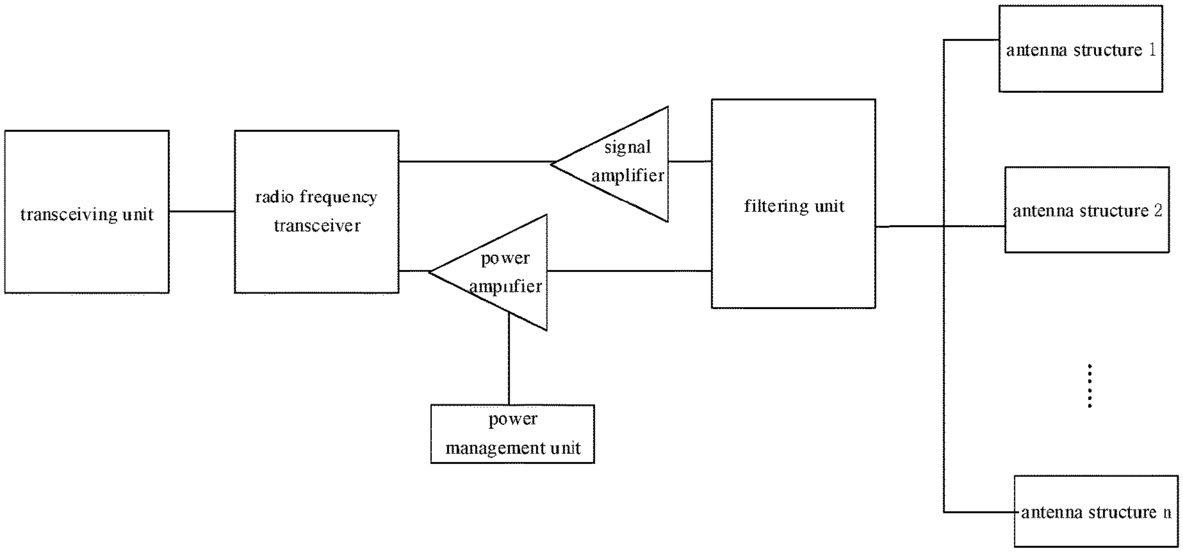
FIG. 9 is an exemplary structural diagram of an electronic device provided in the present disclosure.

In some examples, referring to FIG. 9, the electronic device further includes a transceiver unit, a radio frequency transceiver, a signal amplifier, a power amplifier and a filtering unit. The transceiver unit may include a baseband and a receiving terminal, the baseband provides a signal of at least one frequency band, for example, provides a 2G signal, a 3G signal, a 4G signal, a 5G signal or the like, and transmits the signal of at least one frequency band to the radio frequency transceiver. After receiving the signal, the antenna structure in the electronic device may transmit the signal to the receiving terminal in the transceiver unit after processing the signal by the filtering unit, the power amplifier, the signal amplifier, and the radio frequency transceiver, and the receiving terminal may be, for example, an intelligent gateway.

Furthermore, the radio frequency transceiver is connected to the transceiver unit, and is configured to modulate a signal transmitted by the transceiver unit, or demodulate a signal received by the antenna structure and transmit the modulated signal to the transceiver unit. Specifically, the radio frequency transceiver may include a transmitting circuit, a receiving circuit, a modulating circuit, and a demodulating circuit, and after the transmitting circuit receives multiple types of signals provided by the baseband, the modulating circuit may modulate the multiple types of signals provided by the baseband, and then transmit the modulated signals to the antenna structure. The antenna structure receives the signals and transmits the signals to the receiving circuit of the radio frequency transceiver, the receiving circuit transmits the signals to the demodulating circuit, and the demodulating circuit demodulates the signals and transmits the demodulated signals to the receiving terminal.

Furthermore, the radio frequency transceiver is connected to the signal amplifier and the power amplifier, the signal amplifier and the power amplifier are further connected to the filtering unit, and the filtering unit is connected with at least one antenna structure. In the process of transmitting signals by the electronic device, the signal amplifier is configured to improve the signal-to-noise ratio of the signal output by the radio frequency transceiver and then transmit the signal to the filtering unit; the power amplifier is configured to amplify power of the signal output by the radio frequency transceiver and then transmit the signal to the filtering unit; the filtering unit may include a duplexer and a filtering circuit, and combines signals output by the signal amplifier and the power amplifier, filters clutter out and then transmits the combined signal to the antenna structure, and the antenna structure radiates the signal out. In the process of receiving the signal by electronic device, after receiving the signal, the antenna structure transmits the signal to the filtering unit, the filtering unit filters the signal received by the antenna structure to remove the clutter and then transmits the signal to the signal amplifier and the power amplifier, and the signal amplifier gains the signal received by the antenna structure to increase the signal-to-noise ratio of the signal; the power amplifier amplifies the power of the signal received by the antenna structure. The signal received by the antenna structure is processed by the power amplifier and the signal amplifier and then transmitted to the radio frequency transceiver, and then the radio frequency transceiver transmits the signal to the transceiver unit.

In some examples, the signal amplifier may include various types of signal amplifiers, such as a low noise amplifier, which is not limited herein.

In some examples, the electronic device provided in the present disclosure further includes a power management unit, which is connected to the power amplifier, for providing the power amplifier with a voltage for amplifying the signal.

It will be understood that the above implementations are merely exemplary implementations employed to illustrate the principles of the present disclosure, and the present disclosure is not limited thereto. It will be apparent to those skilled in the art that various changes and modifications may be made without departing from the spirit and scope of the present disclosure, and these changes and modifications are to be considered within the scope of the present disclosure.

What is claimed is:

1. An antenna structure, comprising: a first substrate and a second substrate opposite to each other, and a dielectric layer, with an adjustable dielectric constant, arranged between the first substrate and the second substrate;

the first substrate comprises a first base, a first radiation phase shift unit and a second radiation phase shift unit, wherein the first radiation phase shift unit and the second radiation phase shift unit are arranged on a side, close to the dielectric layer, of the first base, and are insulated from each other;

the second substrate comprises a second base, a third radiation phase shift unit and a fourth radiation phase shift unit, wherein the third radiation phase shift unit and the fourth radiation phase shift unit are arranged on a side, close to the dielectric layer, of the second base, and are insulated from each other;

wherein orthographic projections of the first radiation phase shift unit and the third radiation phase shift unit on the first base at least partially overlap with each other; orthographic projections of the second radiation phase shift unit and the fourth radiation phase shift unit on the first base at least partially overlap with each other;

a first included angle is formed between an extending direction in which a radiation area of the first radiation phase shift unit extends and an extending direction in which a radiation area of the second radiation phase shift unit extends; a second included angle is formed between an extending direction in which a radiation area of the third radiation phase shift unit extends and an extending direction in which a radiation area of the fourth radiation phase shift unit extends, and the first included angle is equal to the second included angle.

2. The antenna structure of claim 1, wherein each of the first radiation phase shift unit, the second radiation phase shift unit, the third radiation phase shift unit and the fourth radiation phase shift unit comprises a radiation portion and a reflective phase shift portion connected to the radiation portion, wherein an orthographic projection of the reflective phase shift portion of the first radiation phase shift unit on the first base and an orthographic projection of the reflective phase shift portion of the third radiation phase shift unit on the first base at least partially overlap with each other, and an orthographic projection of the radiation portion of the first radiation phase shift unit on the first base and an orthographic projection of the radiation portion of the third radiation phase shift unit on the first base at least partially overlaps with each other; an orthographic projection of the reflective phase shift portion of the second radiation phase shift unit on the first base and an orthographic projection of the reflective phase shift portion of the fourth radiation phase shift unit on the first base at least partially overlaps with each other, and an orthographic projection of the radiation portion of the second radiation phase shift unit on the first base and an orthographic projection of the radiation portion of the fourth radiation phase shift unit on the first base at least partially overlaps with each other.

3. The antenna structure of claim 2, wherein the radiation portion of the first radiation phase shift unit and the radiation portion of the second radiation phase shift unit are patch structures; the radiation portion of the third radiation phase shift unit and the radiation portion of the fourth radiation phase shift unit are patch structures; wherein the patch structure of the first radiation phase shift unit comprises a first radiation area, and an orthogonal projection of the first radiation area on the first base is located in an orthogonal projection of the patch structure of the third radiation phase shift unit on the first base; the patch structure of the second radiation phase shift unit comprises a second radiation area, and an orthographic projection of the second radiation area on the second base is located in an orthographic projection of the patch structure of the fourth radiation phase shift unit on the second base.

4. The antenna structure of claim 3, wherein for any one of the first radiation phase shift unit, the second radiation phase shift unit, the third radiation phase shift unit and the fourth radiation phase shift unit, a third included angle is formed between the extending direction in which the radiation area of the radiation portion extends and the extending direction in which the reflective phase shift portion extends.

5. The antenna structure of claim 3, wherein the reflective phase shift portion of each of the first radiation phase shift unit, the second radiation phase shift unit, the third radiation phase shift unit and the fourth radiation phase shift unit is connected at a midpoint of the radiation portion in the extending direction in which the radiation portion extends.

6. The antenna structure of claim 2, wherein the radiation portion of each of the first radiation phase shift unit, the second radiation phase shift unit, the third radiation phase shift unit and the fourth radiation phase shift unit is a dipole structure.

7. The antenna structure of claim 6, wherein the radiation portion of each of the first radiation phase shift unit, the second radiation phase shift unit, the third radiation phase shift unit and the fourth radiation phase shift unit comprises a first radiation sub-portion and a second radiation sub-portion, the first radiation sub-portion and the second radiation sub-portion form the dipole structure; a spacing is formed between the first radiation sub-portion and the second radiation sub-portion, an extending direction in which the first radiation sub-portion extends is the same as an extending direction in which the second radiation sub-portion extends, and the first radiation sub-portion and the second radiation sub-portion are both connected with an end of the reflective phase shift portion of the radiation phase shift unit to which the first radiation sub-portion and the second radiation sub-portion belong.

8. The antenna structure of claim 2, wherein the radiation portion and the reflective phase shiftion portion of each of the first radiation phase shift unit, the second radiation phase shift unit, the third radiation phase shift unit and the fourth radiation phase shift unit are coupled to each other, and are located in different layers; the radiation portion is provided with a slit, and an area where the slit is located defines the radiation area; wherein, an orthographic projection of the slit of the radiation portion on the first base is partially overlapped with the orthographic projection of the reflective phase shift portion of the radiation phase shift unit, to which the radiation portion belongs, on the first base.

9. The antenna structure of claim 2, wherein for any one of the first radiation phase shift unit, the second radiation phase shift unit, the third radiation phase shift unit and the fourth radiation phase shift unit, a third included angle is formed between the extending direction in which the radiation area of the radiation portion extends and the extending direction in which the reflective phase shift portion extends.

10. The antenna structure of claim 9, wherein each of the first included angle and the second included angle is equal to 90°, and/or the third included angle is equal to 90°.

11. The antenna structure of claim 2, wherein the reflective phase shift portion of each of the first radiation phase shift unit, the second radiation phase shift unit, the third radiation phase shift unit and the fourth radiation phase shift unit is connected at a midpoint of the radiation portion in the extending direction in which the radiation portion extends.

12. The antenna structure of claim 2, further comprising: a reflective layer arranged on a side of the second base away from the dielectric layer.

13. The antenna structure of claim 1, further comprising: a reflective layer arranged on a side of the second base away from the dielectric layer.

14. An array antenna, comprising a plurality of antenna structures, each of which is the antenna structure of claim 1.

15. The array antenna of claim 14, wherein the antenna structures are arranged in an array; first bases of the antenna structures are formed into one piece, and second bases of the antenna structures are formed into one piece.

16. The array antenna of claim 14, further comprising a first control unit, a second control unit, a plurality of first signal lines, a plurality of second signal lines, a plurality of third signal lines and a plurality of fourth signal lines, wherein, a first end of each first signal line is connected with one port of the first control unit, and a second end of each first signal line is connected with one first radiation phase shift unit; a first end of each second signal line is connected with one port of the second control unit, and a second end of each second signal line is connected with one second radiation phase shift unit; a first end of each third signal line is connected with one port of the first control unit, and a second end of each third signal lines is connected with one third radiation phase shift unit; a first end of each fourth signal line is connected with one port of the second control unit, and a second end of each fourth signal line is connected with one fourth radiation phase shift unit; each port of the first control unit independently provides a bias voltage, and each port of the second control unit independently provides a bias voltage.

17. An electronic device, comprising the array antenna of claim 14.

18. The electronic device of claim 17, further comprising:

a transceiving unit configured to transmit or receive a signal;

a radio frequency transceiver connected with the transceiving unit and configured to modulate the signal transmitted by the transceiving unit or demodulate a signal received by the antenna structure and then transmit the signal to the transceiving unit;

a signal amplifier connected with the radio frequency transceiver and configured to raise a signal-to-noise ratio of a signal output by the radio frequency transceiver or the signal received by the antenna structure;

a power amplifier connected with the radio frequency transceiver and configured to amplify power of the signal output by the radio frequency transceiver or the signal received by the antenna structure; and a filtering unit connected with the signal amplifier and the power amplifier, connected with the antenna structure and configured to filter a received signal and then transmit the filtered signal to the antenna structure or filter the signal received by the antenna structure.

19. An electronic device, comprising at least one antenna structure of claim 1.

20. The electronic device of claim 19, further comprising:

a transceiving unit configured to transmit or receive a signal;

a radio frequency transceiver connected with the transceiving unit and configured to modulate the signal transmitted by the transceiving unit or demodulate a signal received by the antenna structure and then transmit the signal to the transceiving unit;

a signal amplifier connected with the radio frequency transceiver and configured to raise a signal-to-noise ratio of a signal output by the radio frequency transceiver or the signal received by the antenna structure;

a power amplifier connected with the radio frequency transceiver and configured to amplify power of the signal output by the radio frequency transceiver or the signal received by the antenna structure; and a filtering unit connected with the signal amplifier and the power amplifier, connected with the antenna structure and configured to filter a received signal and then transmit the filtered signal to the antenna structure or filter the signal received by the antenna structure.

* * * * *